United States Patent [19]

Ida et al.

[11] 4,426,225

[45] Jan. 17, 1984

[54] GOLD RECOVERY METHOD

[75] Inventors: Noble N. Ida, Boulder; William D. Wagner, Denver, both of Colo.

[73] Assignee: Storage Technology Corporation, Louisville, Colo.

[21] Appl. No.: 427,365

[22] Filed: Sep. 29, 1982

[51] Int. Cl.$^3$ ............................................. C22B 11/04
[52] U.S. Cl. ...................................... 75/118 R; 75/83
[58] Field of Search ...................... 75/97 R, 97 A, 100, 75/101 R, 83, 118, 83; 156/664, 666; 252/79.4

[56] References Cited

U.S. PATENT DOCUMENTS 3,052,582  9/1962  Snyder ................................ 252/79.4
4,261,738  4/1981  Valentine ......................... 75/101 R Primary Examiner—M. J. Andrews
Attorney, Agent, or Firm—Bryant R. Gold

[57] ABSTRACT

A method is disclosed for recovering visible gold plate from scrap material generated in the production of printed circuit boards and the like without dissolving the gold. The visible gold which is generally adhered to a substrate by a base metal underplating is undermined by etching of the base metal with an aqueous nitric acid etching solution preferably including froth producing compounds. The visible gold plate is recovered as gold flake of substantially the analysis of the gold plate of the scrap.

2 Claims, No Drawings

GOLD RECOVERY METHOD

BACKGROUND OF THE INVENTION

1. Field of the Invention

This invention relates to the recovery of precious metals from scrap materials and more particularly to the recovery of gold, such as in the form of visible gold plate, from printed circuit board scrap material and the like and wherein the gold is recovered in flake form without being dissolved.

2. Description of the Prior Art

Prior art methods for recovery of gold from scrap generally comprise acid dissolution or cyanide dissolution. Both of these methods include as an initial step dissolution of the gold to be recovered. The "scrap" gold is dissolved in an appropriate solution to yield a soluble salt. The choice of salts produced depends entirely on the solubility of the metal anion with the cation. Hence, in the case of acid dissolution the gold is held in solution as soluble gold chloride ($AuCl_2$) and in the case of cyanide is held in solution as soluble gold cyanide ($AuCN$).

Subsequent to dissolution of the gold in this manner either metallic copper or zinc dust is added to the soluble gold salt-containing solution to displace the gold from the salt solution thereby producing free metallic gold and either soluble cupric chloride or zinc cyanide, displacement being dictated by the more electronegative element.

While the chemical steps and reactions attendant acid or cyanide dissolution are essentially very simple, the practice or such methods results in the creation of several significant attendant problems. Foremost among these prior art processes is an alloy of all metallic elements present in the scrap that are soluble in either aqua regia, or chlorine in the presence of oxygen, and cyanide solution. Thus, when using an aqua regia bath, iron, nickel, copper, zinc, cadmium and other elements and alloys such as, bronze will be present wherein an impure gold base alloy will be recovered. With respect to a cyanide dissolution method the recovered gold ingot will generally comprise an alloy of gold with copper, zinc, silver, cadmium and bronze as carry-over elements or alloys.

It will thus be apparent that in order to obtain pure gold by these prior art methods the gold alloy ingot requires further refining. This normally dictates that relatively expensive electrolytic methods must be utilized to derive gold from the gold alloy ingot.

It is recognized in the prior art, see U.S. Pat. No. 4,261,738, that gold may be recovered from scrap materials and wherein the process disclosed therein recovers gold from gold filled scrap as karat gold useable directly in the formation of gold filled blanks and metallic stock which eliminates the step of realloying. Base metal intimately bonded to the gold is leached off with an ammoniacal solution of an ammonium salt using a leaching liquid containing reactive oxygen. The base metal or metals are recovered as metal compounds by thermally decomposing the resulting pregnant leach liquor and the ammonia and ammonium salt are reconstituted for recycling. While the patent teaches that silver and any nickel adhering to karat gold recovered by the ammoniacal leach step may readily be removed from the karat gold by treatment with nitric acid with subsequent filtration for recovery of karat gold, the process disclosed therein is inordinately complex and thus considered to not be cost effective or practicable for situations where relatively small amounts of gold potentially may be recovered from an electronic component manufacturing operation.

The principal object of the present invention is to provide an improved simple, economical method for the recovery of visible gold plate, in pure or alloyed form, such as adhered to a support lamina, e.g., printed circuit board scrap material and the like, by an underplating such as comprising copper, nickel, tin and alloys thereof.

It is another object of the present invention to provide an improved method for the recovery of gold plate wherein the gold plate is never dissolved.

Still another object of the present invention resides in an improved method for the recovery of visible gold plate wherein the gold plate is physically divided into "flakes" to facilitate recovery of the gold by filtration for recovery of gold of substantially the analysis of the gold plate of the scrap material being treated and wherein such recovered concentrate may then be furnace fired to produce a high purity ingot or button.

A further object of the invention resides in an improved method and composition for the recovery of visible gold plate wherein the gold is chemically and physically removed from the scrap material by an aqueous etching solution having froth creating compounds incorporated therein.

SUMMARY OF THE INVENTION

The invention is an improved method for recovery of visible gold plating from scrap material generated from the manufacturer of printed circuit boards and related items such as comprising printed circuit board tabs, printed circuit board trim, and exposed pins. For purposes of the disclosure herein visible gold will be understood to comprise gold plating that may be seen without any need to further subdivide or comminute the scrap material to be treated. Such areas of visible gold are contrasted from areas of hidden gold as oftentimes is encountered with respect to scrap comprising electronic components such as capacitors, molded connectors, transistors and the like.

Scrap of the nature suitable for treatment by the present method includes areas of visible gold plate adhered to, i.e., laminated to or otherwise deposited on, a self-sustaining substrate with an intermediate lamina or under plating, such as copper, nickel, tin, etc. The underplating of such scrap is initially at least partially "visible", in the same sense as set forth with respect to visible gold. The substrate to which the underplating, and consequently the gold, is adhered generally is not solubilized in the present method.

The invention may be characterized as a two-step, or optionally three-step, method for recovering visible gold in the physical form of gold flake, or optionally an ingot or button of fused gold flake. The first step involves contacting the visible gold-containing scrap with an aqueous nitric acid etching solution. The nitric acid preferentially etches away the underplating, commencing with the initially visible portion, thereby creating a chemical tunneling effect under the visible gold. As the underplate is progressively etched the visible gold plating loosens and flakes off whereby additional areas of underplating are rendered "visible" with the result that the visible gold plating progressively is loosened and flaked off. Thus, at the conclusion of the first step of the method there is derived a pregnant etching solution comprising gold flakes of the analysis of the original visible gold plate in an etch liquor including nitrates of the metals comprising the underplating. The first step is generally carried out for a period of time sufficient to etch substantially all underplating intermediate the visible gold and the substrate. However, it will be appreciated that the law of diminishing returns may dictate that the first step be terminated before all gold is flaked off since the last vestiges of gold may be difficult to recover.

In this latter regard, in a preferred embodiment of the invention, froth producing compounds are incorporated in the aqueous nitric acid etching solution. The incorporation of a froth producing agent is highly desirable, if not critical, if substantially all the visible gold present on the scrap material is to be recovered. It will be understood that due to the generally high surface tension existing between the gold, which has been tunneled under, and the substrate, smaller flakes of gold will not readily separate from the scrap substrate. This of course results in a reduced recovery of gold.

The second step of the present method comprises physically separating the gold flake from the pregnant etch liquor, and the non-solubilized substrate, whereby gold flake of substantially the analysis of the visible gold plate of the scrap material is recovered. The gold flake may be recovered from the pregnant etch solution by any of a number of conventional processes such as including filtration or centrifugal separation including the conventional step attendant thereto of washing the gold flake residue to minimize or eliminate pregnant etch solution residue on the flake.

Optionally, and particularly in the instance wherein separation of gold flake from the pregnant etch liquor is effected by means of suction filtration utilizing ashless filter paper to retain the gold flake, the filter paper and gold flake retained thereon is flame burned to derive a residue of gold flakes of substantially the analysis of the visible gold plate of the scrap material.

DETAILED DESCRIPTION OF THE INVENTION

The method of the present invention for recovery of visible gold plating from printed circuit board scrap and the like comprises as a first step preferentially etching away a base metal underplating, intermediate the visible gold and a self-sustaining substrate, with an aqueous nitric acid etching solution comprising by weight 50% nitric acid ($HNO_3$). The etching results in the formation of an aqueous pregnant etch liquor containing solubilized underplating, derived from a chemical tunneling effect under the visible gold plate, and gold in flake form.

In a preferred embodiment of the method comprising the present invention the aqueous nitric acid etching solution further comprises:
50 weight percent nitric acid ($HNO_3$)
20-100 gm/l potassium phosphate ($K_3PO_4$)
10-50 gm/l citric acid ($H_3C_6H_5 \cdot H_2O$)

The addition of potassium phosphate and citric acid to the nitric acid etching solution provides a vigorous frothing action that tends to overcome surface tension induced by the adherence of gold flake to the substrate. The use of such phosphate-citric acid modified nitric acid etching solution greatly enhances the recovery of visible gold in terms of both the amount of gold recovered and the time expended in recovering the gold. It has been found that in the order of 25% to 30% more gold can be recovered for a given period of time as opposed to the use of an aqueous etching solution using nitric acid per se. In practice, this normally results in the recovery of an amount of gold greater than would otherwise be recovered since the diminishing returns of prolonged etching solution contact time dictate against such a practice to recover the last vestiges of gold from the scrap material.

The high purity flakes of visible gold, i.e. a purity or analysis of substantially the analysis of the visible gold plate of the scrap material, are subsequentially separated by filtration or the like preferably through the use of ashless filter paper and a Buechner suction funnel. Alternatively, a self-contained gold recovery apparatus, of the type disclosed in copending patent application Ser. No. 427,364, filed 9/29/82, attorney docket no. R/T-81-9, may be employed to effectuate the method of the present invention, including the separation of the gold flake from the aqueous pregnant etch liquor. The gold flake concentrate so derived is then preferably flame fired at a temperature slightly in the order of 1950° F. corresponding to a temperature in excess of the melting point of gold, thereby to produce an ingot or button of substantially the analysis of the visible gold plate of the scrap material.

EXAMPLES

EXAMPLE I

Visible gold plate-coating fingers, or connector tabs sheared from 100 standard 8 inch by 11 inch printed circuit boards and comprising approximately 200 connector tabs were immersed in an aqueous nitric acid etching solution comprising 50% nitric acid for approximately two hours at ambient temperature.

The resulting pregnant etch liquor containing gold flakes was filtered onto standard ashless filter paper using a Buechner section funnel and the flake residue washed with water.

The filter paper-carried gold flakes were flame burned at a temperature in the order of about 1950° F. leaving a residue of gold flakes. 3.38 grams of gold were recovered. The economic viability of the method of the present invention readily can be appreciated when one takes into consideration the fact that nitric acid is relatively inexpensive and that 3.38 grams of gold is approximately 0.109 troy ounces, which has significant value when one considers the current world market price of gold.

EXAMPLE II

The method of Example I was repeated with the exception that the aqueous etching solution comprised:
50 weight percent nitric acid
20 gm/l potassium phosphate
10 gm/l citric acid.

The gold recovered comprised approximately 4.23 grams. This represents an approximately 25% increase in the amount of gold recovered.

EXAMPLE III

The method of Example I was repeated with the exception that the aqueous etching solution comprised:
50 weight percent nitric acid
100 gm/l potassium phosphate
50 gm/l citric acid The gold recovered comprised approximately 4.39 grams. This represents an approximately 30% increase in the amount of gold recovered.

EXAMPLE IV

Approximately eight pounds of connector tabs sheared from printed circuit boards were processed in an apparatus of the type disclosed in copending patent application "Gold Recovery Apparatus," Ser. No. 427,364, filed 9/29/82, for approximately 4 hours at ambient temperature. The etching solution used in the apparatus comprised 50% nitric acid. The filter used with the device was made from 320 mesh stainless steel (302). The rinsing solution was water.

The gold recovered comprised 1.33 troy ounces.

We claim:

1. A method for the recovery of visible gold plate, in pure or alloyed form, adhered to a support lamina of printed circuit board scrap material by an at least partially visible underplating selected from the group consisting of copper, nickel, tin and alloys thereof, comprising the steps of:

(a) preferentially etching away the underplating with an aqueous etching solution comprising approximately 50% weight percent $HNO_3$ and a froth producing agent, thereby to form an aqueous pregnant etch liquor containing solublized underplating, derived from a chemical tunneling effect and vigorous frothing action under the visible gold plate, and the gold in flake form;

(b) physically separating the gold flake from the pregnant etch liquor; and (c) recovering gold flake of substantially the analysis of the gold plate of said scrap material.

2. The method of claim 1 wherein said froth producing agent of said etching solution comprises about 20 to about 100 grams per liter of $K_2PO_4$ and about 10 to about 50 grams per liter of $K_3C_6H_5O_7.H_2O$.

* * * * *